United States Patent
Toyoda et al.

(10) Patent No.: US 6,582,833 B2
(45) Date of Patent: Jun. 24, 2003

(54) TI-BASE WIRE ROD FOR FORMING MOLTEN METAL

(75) Inventors: Kazuhiro Toyoda, Nagoya (JP); Makoto Chujoya, Nagoya (JP); Shigeo Hanajima, Nagoya (JP); Takashi Suzuki, Nagoya (JP); Takashi Orii, Nagoya (JP); Takao Shimizu, Nagoya (JP); Toshiharu Noda, Nagoya (JP); Bunji Naito, Nagoya (JP); Kohachiro Ohashi, Nagoya (JP)

(73) Assignee: Daido Tokushuko Kabushiki Kaisha, Aichi (JP)

( * ) Notice: Subject to any disclaimer, the term of this patent is extended or adjusted under 35 U.S.C. 154(b) by 0 days.

(21) Appl. No.: 10/192,505

(22) Filed: Jul. 11, 2002

(65) Prior Publication Data

US 2003/0084969 A1 May 8, 2003

(30) Foreign Application Priority Data

Jul. 12, 2001 (JP) .......... 2001-212326
Mar. 7, 2002 (JP) .......... 2002-062438
Jun. 27, 2002 (JP) .......... 2002-188327

(51) Int. Cl.$^7$ .......... B32B 15/02; B23K 35/22
(52) U.S. Cl. .......... 428/610; 219/137 WW; 219/146.22; 428/687; 428/385; 428/386; 428/469; 428/472.1; 428/702; 428/923; 428/925

(58) Field of Search .......... 428/610, 687, 428/385, 386, 469, 472.1, 702, 923, 925; 219/137, 137 WM, 146.22

(56) References Cited

U.S. PATENT DOCUMENTS

| | | |
|---|---|---|
| 2,961,351 A | 11/1960 | Ludwig |
| 3,793,071 A | 2/1974 | Bomberger, Jr. |
| 4,331,857 A | 5/1982 | Crisci et al. |

OTHER PUBLICATIONS

Patent Abstracts of Japan, vol. 012, No. 091, Mar. 24, 1988 and JP 62–228337 A, Oct. 7, 1987, Abstract.

Primary Examiner—Robert R. Koehler
(74) Attorney, Agent, or Firm—Townsend & Banta

(57) ABSTRACT

A Ti-base wire rod for forming molten metal excellent both in rod feeding smoothness and arc stability is disclosed. A wire rod 301 is composed of Ti metal, and has in the surficial portion including the surface thereof an oxygen enriched layer having an oxygen concentration higher than that in an inner portion. Ratio $T_w/D_w$ of the thickness $T_w$ of the oxygen enriched layer and the diameter $D_w$ of the wire rod is adjusted within a range of $1\times10^{-3}$ to $1\times10^{-1}$, and the average oxygen concentration of the oxygen enriched layer is adjusted to 1 wt % or above.

12 Claims, 9 Drawing Sheets

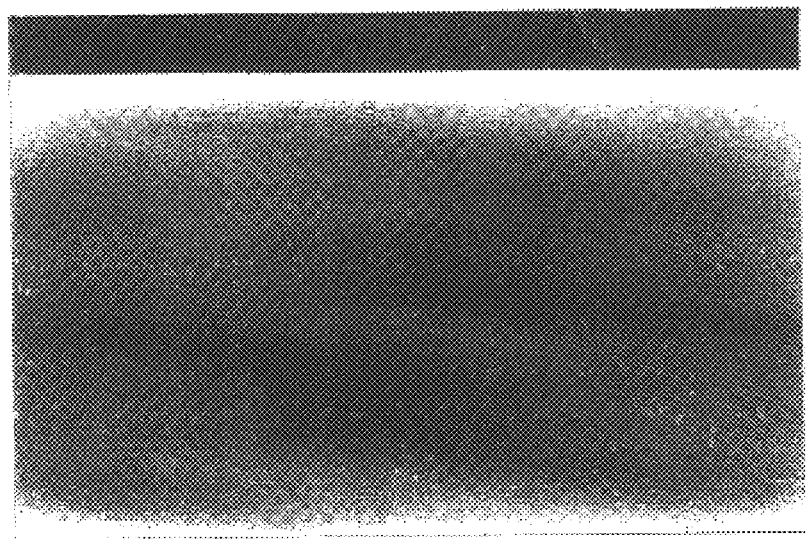
FIG. 6A
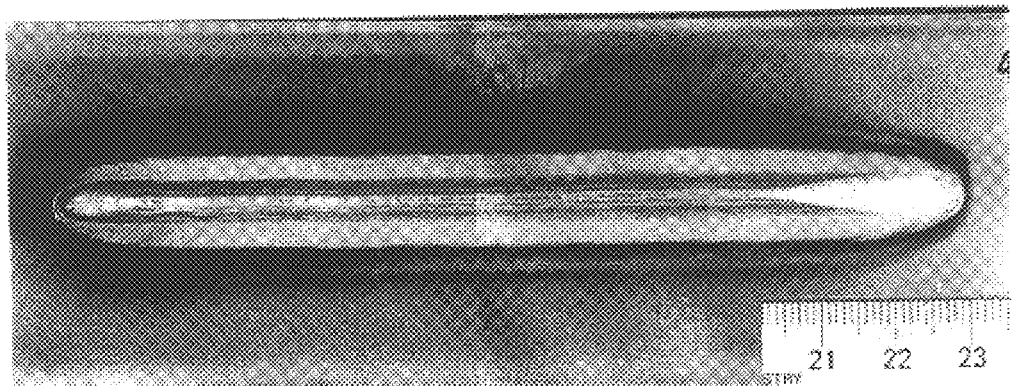
FIG. 6B
---
FIG. 6C

TI-BASE WIRE ROD FOR FORMING MOLTEN METAL

RELATED APPLICATIONS

This application claims the priority of Japanese Patent Applications No. 2001-212326 filed on Jul. 12, 2001 No. 2002-62438 filed on Mar. 7, 2002 and No. 2002-188327 filed on Jun. 27, 2002 which are incorporated herein by reference.

BACKGROUND OF THE INVENTION

1. Field of the Invention

The present invention relates to a Ti-base wire rod used for forming molten metal in welding and thermal spraying.

2. Description of the Related Art

Shield arc welding is generally employed for welding of Ti-base metal members made of Ti metal or Ti alloy, in which Ti-base wire rod composed of an industrial pure Ti is used, and a portion to be weld is covered with an inert gas in order to prevent Ti from being oxidized. In a typical case of MIG (metal inert gas) arc welding shown in FIG. 5, arc AR is generated between a Ti-base wire rod 201 for use in welding and a work piece WP made of pure titanium or titanium alloy in an atmosphere of inert gas IG such as argon, helium or so. The welding is proceeded while feeding the wire rod 201 with the aid of a feed roller 202 so that the end of such rod is melted in the arc AR. A reference numeral 205 herein represents a gas nozzle (torch) for injecting the inert gas IG from the end thereof, which nozzle has at the base end thereof a flexible conduit tube 204. A reference numeral 206 herein represents an electrode chip (contact chip) fixed to the torch 205, which is responsible for holding of the wire rod 201 and for supplying electric current to such wire rod 201, WM represents a welding bead, and MP represents a molten pool. The MIG arc welding is advantageous in raising the efficiency of the welding, suppressing welding failure thanks to a deeper weld zone resulted from an improved welding energy, and facilitating welding at narrow places with a down-sized end portion of the torch 205.

On the other hand, it has been a general practice to form a coated layer with Ti-base metal by thermal spraying for the purpose of corrosion prevention for large-sized members. In the field of thermal spraying, a thermal sprayed layer is formed using a similar Ti-base wire rod as described in the above by thermal spraying process, typically by arc thermal spraying process. In the arc thermal spraying process, two Ti-base wire rods are fed to holders for current supply in parallel to thereby form an arc discharge gap between both ends of such rods, and a molten metal formed there is then sprayed using an inert gas such as nitrogen or argon, or using air as a medium so as to allow a thermal sprayed layer to deposit on a target work piece. The Ti-base wire rods are respectively fed through conduit tubes to a thermal spray gun similarly to the case of welding.

In recent years, there are accelerated trends in increasing feeding speed of the wire rod 201 aiming at higher efficiency in the Ti welding process and shorter period before completion of the welding process. In such situation, a large friction between the surface of the wire rod 201 and the conduit tube 204 undesirably interferes smooth feeding of the wire rod 201, which may at worst result in clogging or buckling of the wire rod 201 within the conduit tube 204.

In particular, surface of the conventional Ti-base welding wire rods are generally finished by mechanical or chemical polishing so as to produce a metallic gloss merely for the purpose of improving the appearance. Thus finished wire rods are however poor in feeding smoothness due to their coarse surfaces. Such wire rods having the metallic glossy appearance are also disadvantageous in that being causative of less stable arc during the welding as expected from their appearance, and desirable bead shape cannot be obtained in particular by MIG arc welding using an automatic welder since the arc trembles searching for a stable point. This may be ascribable also to that distance between the end of the wire rod and a work piece to be welded can finely fluctuate due to irregularity in the rod feeding speed.

In MIG arc welding of Fe-base members, surface of a Fe-base wire rod for welding is often plated with Cu or coated with a lubricating oil. In contrast, in the welding of Ti which is a labile metal, provision of such Cu plating or coating of such lubricating oil on the surface of the wire rod will not be practical since it may degrade strength of the weld joint due to possible formation of a brittle Cu—Ti-base intermetallic compound or carbide. While there is another long-established measures for stabilizing the arc during welding by introducing carbon dioxide gas or oxygen in the shield gas, such measures is still unsatisfactory since a large amount of oxygen uptake from the shield gas into the welding bead will occur, which may degrade elongation of the weld joint in particular for the case of Ti welding.

Also Ti thermal spraying essentially suffers from the same problem as in the welding. In arc thermal spraying for example, the arc is formed between two Ti-base wire rods, so that irregularity in the feeding speed of either one of such wire rods will vary gap distance for the arc discharge to thereby destabilize the arc. It can thus be concluded that the problem in the arc stability can occur more frequently than in welding.

SUMMARY OF THE INVENTION

It is therefore an object of the present invention to provide a Ti-base wire rod for forming molten metal, which is excellent both in feeding smoothness and arc stabilizing property in welding or thermal spraying, and is capable of ensuring desirable mechanical properties of the resultant weld portion, and quality of obtained thermal sprayed layer.

To solve the foregoing problems, a Ti-base wire rod for forming molten metal of the present invention is such that being serially melted from an end user heating to thereby produce molten metal comprising Ti or Ti alloy, wherein at least a portion including the surface of the wire rod comprises Ti metal or Ti alloy mainly composed of Ti, and the surficial portion of the wire rod including the surface thereof has formed therein an oxygen enriched layer having an oxygen concentration higher than that in the inner portion, and having a thickness larger than that of native oxide film possibly formed on the Ti metal in the air under ordinary temperature. The ordinary temperature is, for example, 20° C.

Since Ti is a labile metal, the surface thereof is readily passivated in the air at ordinary temperatures to thereby produce native oxide film. The native oxide film can suppress internal corrosion of the metal, which ensures Ti metal or Ti alloy mainly comprising Ti an excellent corrosion resistance. The native oxide film mainly comprises $TiO_2$ having an average oxygen concentration of approx. 40 wt %, which concentration is of course higher than that of the inner portion comprising Ti metal. The native oxide film thus can be rated as a kind of oxygen enriched layer. The thickness of the native oxide film is however considerably small, which is as thin as approx. 40 to 100 nm.

What is formed on the surface of the wire rod in the present invention is an oxygen enriched layer having a thickness larger than that of the native oxide film. By intentionally forming on the surface of the wire rod the oxygen enriched layer with the thickness larger than that of the native oxide film, feeding smoothness of the wire rod through a conduit tube or so will considerably be improved, which results in improved stability of arc typically during arc welding or arc thermal spraying. More specifically, this will ensure the following effects (the same will apply to a second aspect of the present invention described later):

(1) improved feeding smoothness of the wire rod through the conduit tube will remarkably reduce apprehensions for clogging or buckling of the wire rod, which successfully reduces frequency of process interruption and raises process efficiency in welding or thermal spraying. More specifically, while the coefficient of dynamic friction of conventional Ti wire rod having a polished surface is 0.5 to 0.6 or around, the present invention can desirably reduce the coefficient as low as typically to 0.13 to 0.17 or around; and (2) improved arc stability will result in improved mechanical strength of the obtained weld portion or quality of the thermal sprayed layer. Although thermal spraying, in which two Ti-base wire rods are concurrently fed, is more likely to be affected by feeding smoothness of such wire rods and tends to suffer from disturbance of the arc, using of the Ti-base wire rods of the present invention can ensure sustainment of stable arc thermal spraying.

In view of stabilizing the arc, the above described effect (2) will be predominant especially in arc welding in which the arc is covered with an inert gas containing no oxygen. On the other hand, arc thermal spraying can be proceeded in either way such that using an oxygen-containing spraying medium such as compressed air, or such that using an inert gas medium such as nitrogen, argon or the like, where the arc stabilizing effect (2) will be predominant especially for the case using the inert gas medium.

A Ti-base wire rod for forming molten metal according to the second aspect of the present invention is such that being serially melted from an end under heating to thereby produce molten metal comprising Ti or Ti alloy, wherein at least a portion including the surface of the wire rod comprises Ti metal or Ti alloy mainly composed of Ti, and the surficial portion of the wire rod including the surface thereof has formed therein an oxygen enriched layer having an oxygen concentration higher than that of the inner portion, such oxygen enriched layer being adjusted so that ratio $T_w/D_w$ falls within a range from $0.3 \times 10^{-3}$ to $1 \times 10^{-1}$, where $T_w$ represents the thickness of the oxygen enriched layer and $D_w$ represents the diameter of the wire rod; and such oxygen enriched layer having an average oxygen concentration of 1 wt % or above.

In the Ti-base wire rod for forming molten metal according to the second aspect of the present invention, what is formed on the surface of the wire rod is an oxygen enriched layer having a thickness larger than that of the native oxide film, being more specifically adjusted so that ratio $T_w/D_w$ falls within a range from $0.3 \times 10^{-3}$ to $1 \times 10^{-1}$ on the basis of $D_w$, which is equivalent to that thickness $T_w$ equals to 0.03 to 10% of diameter $D_w$ of the wire rod, and having an average oxygen concentration of 1 wt % or above. By forming the oxygen enriched layer with such thickness and average oxygen concentration, feeding smoothness of the wire rod through a conduit tube or so will considerably be improved similarly to the foregoing first aspect, which results in improved stability of arc typically during arc welding or arc thermal spraying.

The ratio $T_w/D_w$ of the thickness $T_w$ of the oxygen enriched layer and the diameter $D_w$ of the wire rod less than $1 \times 10^{-3}$ (0.1% of the rod diameter $D_w$) or the average oxygen concentration of the oxygen enriched layer less than 1 wt % will result in insufficient improving effect of the feeding smoothness. Another problem resides in that the arc will be more likely to destabilize, which is disadvantageous in forming uniform welding bead or thermal sprayed layer. On the contrary, $T_w/D_w$ exceeding $1 \times 10^{-1}$ (10% of the rod diameter $D_w$) will require a considerably long time for forming the oxygen enriched layer, and even the difficulty in the formation results in only a limited effect (which may be even harmful when the wire rod is intended for use in welding or so, since strength of the weld joint in weld structure may be degraded).

The average oxygen concentration of the oxygen enriched layer reaches maximum when the entire portion of the oxygen enriched layer is composed of titanium oxide, and the value thereof is considered as being equal to an oxygen content ratio estimated from a formula weight of the resultant oxide. For example, when the resultant oxide is $TiO_2$, the upper limit of the average oxygen concentration estimated from the stoichiometric oxygen content will be 40.06 wt % (calculated assuming atomic weight of titanium as 47.88 and oxygen as 16.0). On the other hand, it is also allowable to form a titanium oxide having a stoichiometric oxygen ratio larger than that of $TiO_2$, where forming $Ti_2O_5$ for example will result in the upper limit of the average oxygen concentration of 45.52%. It is thus not realistic in general that the average oxygen concentration of the oxygen enriched layer exceeds 45.52%.

When considering the foregoing effect of (2), that is, oxygen localized in the oxygen enriched layer in the surficial portion vaporizes out into the shield gas atmosphere in the early stage of the arc melting, which creates an atmosphere equivalent to that obtained when an oxygen-containing shield gas is used, to thereby stabilize the arc, it is concluded that the oxygen enriched layer is more advantageous when it has an average oxygen concentration lower than that of the native oxide film (titanium oxide: particularly $TiO_2$). The fact that the average oxygen concentration of the oxygen enriched layer is lower than that of the native oxide film means that the oxygen enriched layer contains an area where the oxygen concentration is suppressed at a level lower than in the native oxide film, which more specifically means that the oxygen enriched layer is not fully converted into $TiO_2$ but partially contains an area having mixed therein metal-state Ti. In an exemplary case in which the oxygen enriched layer is formed by thermal oxidation process (described later), the outermost portion thereof will have an oxygen content almost equivalent to that of titanium oxide, but the inner portion thereof will be an area having an oxygen concentration lower than that of titanium oxide and instead will have an oxygen diffused layer which comprises a Ti-base metal phase containing oxygen diffused therein (for example oxygen-stabilized α case). Oxygen in the oxygen diffused layer exist in a form of fine titanium oxide grains diffused in the metal phase, or as being dissolved in the metal phase. Such oxygen (dissolved oxygen in particular) is supposed to have a bond strength with Ti weaker than that of oxygen contained in the native oxide film, so that the oxygen is rather likely to vaporize in the early stage of arc melting, and is thus supposed to more effectively contribute to arc stabilization. In this point of view, the average oxygen concentration of the oxygen enriched layer is preferably set within a range from 1 wt % and 40 wt %, both ends inclusive. It is also preferably for the oxygen enriched layer that the thickness of the area having an oxygen content lesser than that of titanium oxide ($TiO_2$ in particular) is larger than that of the outermost titanium oxide, and more preferably twice or more larger than the thickness of the outermost titanium oxide layer.

In order to obtain more eminent arc stabilization effect, it is more preferable that the ratio $T_w/D_w$ of the thickness $T_w$ of the oxygen enriched layer and the diameter $D_w$ of the wire rod resides within a range from $1\times10^{-3}$ to $1\times10^{-1}$. In particular for the case in which the foregoing oxygen diffused layer is formed together with the outermost titanium oxide layer (equivalent to or thicker than the native oxide film (approx. 40 to 100 nm)) typically by the thermal oxidation process, $T_w/D_w$ will be more likely to fall within the above preferable range since the thickness of the oxygen enriched layer will have additional thickness contributed by the oxygen diffused layer.

The thickness and average oxygen concentration of the oxygen enriched layer can be determined as described below. A section of the wire rod is mirror-polished, and is then subjected to in-plane analysis of oxygen concentration by EPMA (electron probe micro-analysis), in which the peripheral portion of the wire rod having an oxygen concentration of 1.2 $C_m$ or above, where $C_m$ represents the oxygen concentration of the core portion, is defined as the oxygen enriched layer, and an integral average value of oxygen concentration of such portion is defined as the average oxygen concentration. When the oxygen concentration has some variation along the circumferential direction of the wire rod section, concentration measurement circles are virtually defined at various positions on the radial direction of the section, and average values of the oxygen concentration are measured along the individual concentration measurement circles to thereby estimate the oxygen concentration distribution averaged along the circumferential direction. The oxygen enriched layer is finally defined as a circumferential area having the oxygen concentration of 1.2 Cm in the foregoing oxygen concentration distribution along the radial direction of the section.

The Ti-base wire rod of the present invention is available as a Ti welding wire rod for forming weld metal as the molten metal, and also available as a Ti thermal spraying wire rod for forming thermal sprayed metal layer as the molten metal.

Preferable upper limits of the values for $T_w/D_w$ and average oxygen concentration of the oxygen enriched layer differ between the wire rod for welding and those for thermal spraying. Requirements for the strength are not so stringent in many cases for the thermal sprayed layer than those for weld joint (of course there are some exceptions), so that air can be used as a spraying medium for molten metal. In such case, oxygen concentration of the layer will consequently become high because the molten Ti metal deposits to thereby form the thermal sprayed layer while reacting with oxygen in the air, which is sufficient for practical use unless otherwise an especially high strength is required. So that as for wire rod to be employed in thermal spraying, raising the values for $T_w/D_w$ and average oxygen concentration of the oxygen enriched layer as high as to the upper limits will never result in nonconformity when considering that the employed wire rod is oxidized under molten state as a consequence.

On the contrary as for wire rod for use in welding, an excessively large thickness of the oxygen enriched layer or excessively high average oxygen concentration thereof may sometimes result in nonconformity such as degraded strength of weld joint in thus obtained weld structure. In such case, it is preferable to adjust $T_w/D_w$ to $50\times10^{-3}$ (5% of the diameter $D_w$ of wire rod) or below, and the average oxygen concentration of the oxygen enriched layer to 30 wt % or below. Also in thermal spraying, using an inert gas for spraying medium such as argon or so, it may sometimes be preferable to limit $T_w/D_w$ and average oxygen concentration within similar ranges when there is a need for forming a thermal sprayed layer with a high strength while suppressing oxidation as possible.

The Ti-base wire rod for forming molten metal according to the present invention mainly comprises Ti. It is to be noted that the expression "mainly comprises Ti" in the context of this specification means that Ti is a component contained in a largest content, and preferably means that Ti is contained in an amount of 50 wt % or above. For the case a Ti alloy is employed, it is allowable to use various additional elements as side-components for the purpose of improving strength or ductility of the resultant weld portion or thermal sprayed layer. Possible candidates for the additional elements and preferable ranges of the amount of use thereof will be explained in the next paragraphs.

(1) Al: 9 wt % or below

Al can stabilize α phase, which is a low temperature phase of Ti, and strengthen the α phase by forming solid solution therewith. The content thereof exceeding 9 wt % will however adversely affect toughness and ductility since an intermediate phase (intermetallic compound) such as $Ti_3Al$ is formed in a large amount. The addition in an amount of 1 wt % or more is preferable to achieve a more distinct effect, and within a range from 2 to 8 wt % is more preferable.

(2) At least either of N and O: 0.5 wt % or below in total

Also N and O can stabilize and strengthen the α phase similarly to Al, where O shows more distinct effect of addition. The total content exceeding 0.5 wt % will however result in degraded toughness and ductility. The addition in an amount of at least 0.03 wt % in total is preferable to obtain a distinct effect, and more preferably within a range from 0.08 to 0.2 wt %. It is to be noted that the oxygen content herein means an oxygen content of the inner portion other than the oxygen enriched layer.

(3) Any one or two or more of V, Mo, Nb and Ta: 45 wt % or below in total

All of these are stabilizing element for the β phase, and advantageous in improving hot workability and strengthening through annealing. All of these elements are however high in specific gravity and melting point, so that excessive addition thereof will adversely affect the light weight nature and large specific strength, which are advantages specific to Ti alloys, and will make it difficult to use a Ti alloy ingot in manufacturing process due to elevated melting point of the alloy. The upper limit of the amount of addition is thus defined as 45 wt % in total. On the other hand, the addition in an amount of at least 1 wt % in total is preferable to obtain a distinct effect. Mo and Ta may sometimes be added only in a small amount in order to improve corrosion resistance of the alloy.

(4) Any one or two or more of Cr, Fe, Ni, Mn and Cu: 15 wt % or below in total

Also these elements have effect of stabilizing the β phase, and are effective in improving hot workability and strengthening through annealing. It is to be noted, however, that all of the elements are likely to form intermediate phase with Ti (e.g., $TiCr_2$, TiFe, $Ti_2Ni$, TiMn, $Ti_2Cu$), and excessive addition thereof will tend to degrade the ductility and toughness, so that the upper limit of the amount of addition is defined as 15 wt % in total. The addition in an amount of at least 0.5 wt % in total is preferable to achieve a more distinct effect. Ni may sometimes be added only in a small amount in order to improve corrosion resistance of the alloy.

(5) At least either of Sn and Zr: 20 wt % or below in total

These are known as neutral additive elements capable of strengthening both of α phase and β phase. It is to be noted that excessive addition will only saturate the effect, so that the upper limit of the amount of addition is defined as 20 wt %. The addition in an amount of at least 0.5 wt % in total is preferable to achieve a more distinct effect.

(6) Si: 0.7 wt % or below

Si can enhance creep resistance (creep rupture strength) of the alloy, and improve the heat resistance. An excessive addition thereof will however degrade the creep rupture strength and ductility due to formation of intermetallic compound such as $Ti_5Si_3$, so that the upper limit of the amount of addition is defined as 0.7 wt %. The addition in an amount of at least 0.03 wt % is preferable to achieve a more distinct effect, and more preferably within a range from 0.05 to 0.5 wt %.

(7) At least either of Pd and Ru: 0.5 wt % or below in total

These elements exhibit an effect of improving corrosion resistance of the alloy. Since they are noble metals and thus expensive, the upper limit of the amount of addition is defined as 0.5 wt % while considering saturation of the effect or so. The addition in an amount of at least 0.02 wt % in total is preferable to achieve a more distinct effect.

Specific examples of the alloy composition will be enumerated below, where the composition herein is expressed as being headed by Ti, which is followed by side-components as being connected with hyphens together with numerals for representing compositions while omitting the unit "wt %" (for example, Ti-6 wt % Al-4 wt % V alloys is simply expressed as Ti Ti-6Al-4V).

(1) α-Type alloys
  Ti-5Al-2.5Sn, Ti-5.5Al-3.5Sn-3Zr-1Nb-0.3Mo-0.3Si, Ti-2.5Cu (2) Near-α+β-type alloys
  Ti-6Al-2Sn-4Zr-2Mo-0.1Si, Ti-8Al-1Mo-1V, Ti-2.25Al-2Sn-4Zr-2Mo, Ti-6Al-2Sn-2Zr-2Mo-0.25Si, Ti-6Al-2Nb-1Ta-0.8Mo, Ti-6Al-2Sn-1.5Zr-1Mo-0.35Bi-0.1Si, Ti-6Al-5Zr-0.5Mo-0.2Si, Ti-5Al-6Sn-2Zr-1Mo-0.25Si (3) α+β-type alloys
  Ti-8Mn, Ti-3Al-2.5V, Ti-6Al-4V, Ti-6Al-6V-2Sn, Ti-7Al-4Mo, Ti-6Al-2Sn-4Zr-6Mo, Ti-6Al-2Sn-2Zr-2Mo-2Cr-0.25Si, Ti-10V-2Fe-3Al, Ti-4Al-2Sn-4Mo-0.2Si, Ti-4Al-4Sn-4Mo-0.2Si, Ti-2.25Al-11Sn-4Mo-0.2Si, Ti-5Al-2Zr-4Mo-4Cr, Ti-4.5Al-5Mo-1.5Cr, Ti-6Al-5Zr-4Mo-1Cu-0.2Si, Ti-5Al-2Cr-1Fe (4) β-Type alloys
  Ti-13V-11Cr-3Al, Ti-8Mo-8V-2Fe-3Al, Ti-3Al-8V-6Cr-4Mo-4Zr, Ti-11.5Mo-6Zr-4.5Sn, Ti-11V-11Zr-2Al-2Sn, Ti-15Mo-5Zr, Ti-15Mo-5Zr-3Al, Ti-15V-3Cr-3Al-3Sn, Ti-22V-4Al, Ti-15V-6Cr-4Al (5) Near-β-type alloy
  Ti-10V-2Fe-3Al (6) Corrosion-resistant alloys (while available for welding, they are particularly useful for the purpose of forming corrosion-resistant layer by thermal spraying)
  Ti-0.15Pd, Ti-0.3Mo-0.8Ni, Ti-5Ta In the present invention, the oxygen enriched layer of the Ti-base wire rod for forming molten metal can be formed by annealing the Ti-base metal wire rod in an oxygen-containing atmosphere. Examples of available oxygen-containing atmospheric include not only oxygen-containing nitrogen atmosphere (including air atmosphere) and oxygen-containing inert gas atmosphere, but also gaseous atmosphere containing oxygen compound such as steam. In view of efficient formation of the oxygen enriched layer having a necessary and sufficient thickness, it is preferable to use an oxygen-containing atmosphere having a partial pressure of oxygen of $5\times10^3$ to $15\times10^3$ Pa, and annealing temperature is preferably set at 500 to 800° C. for example. The oxygen enriched layer can be formed by, besides the foregoing thermal oxidation, embedding Ti oxide grains in the surficial portion of the wire rod, or by depositing a titanium oxide layer by vapor-phase film forming process such as vapor deposition and sputtering. The titanium oxide layer can still also be formed by well-known sol-gel process. Also for the cases that the titanium oxide layer is formed according to any of these methods, it is more preferable to form an additional oxygen enriched layer by thermal oxidation.

BRIEF DESCRIPTION OF THE DRAWINGS

FIG. 6A is a SEM photograph of an exemplary Ti-base welding wire rod of the present invention, FIG. 6B is a photograph of an outer appearance of a welding bead formed by using such wire rod, and FIG. 6C is a measured profile of the feeding reaction force;

DESCRIPTION OF THE PREFERRED EMBODIMENTS

Preferred embodiments of the present invention will be described hereinafter referring to attached drawings.

Figure 1:
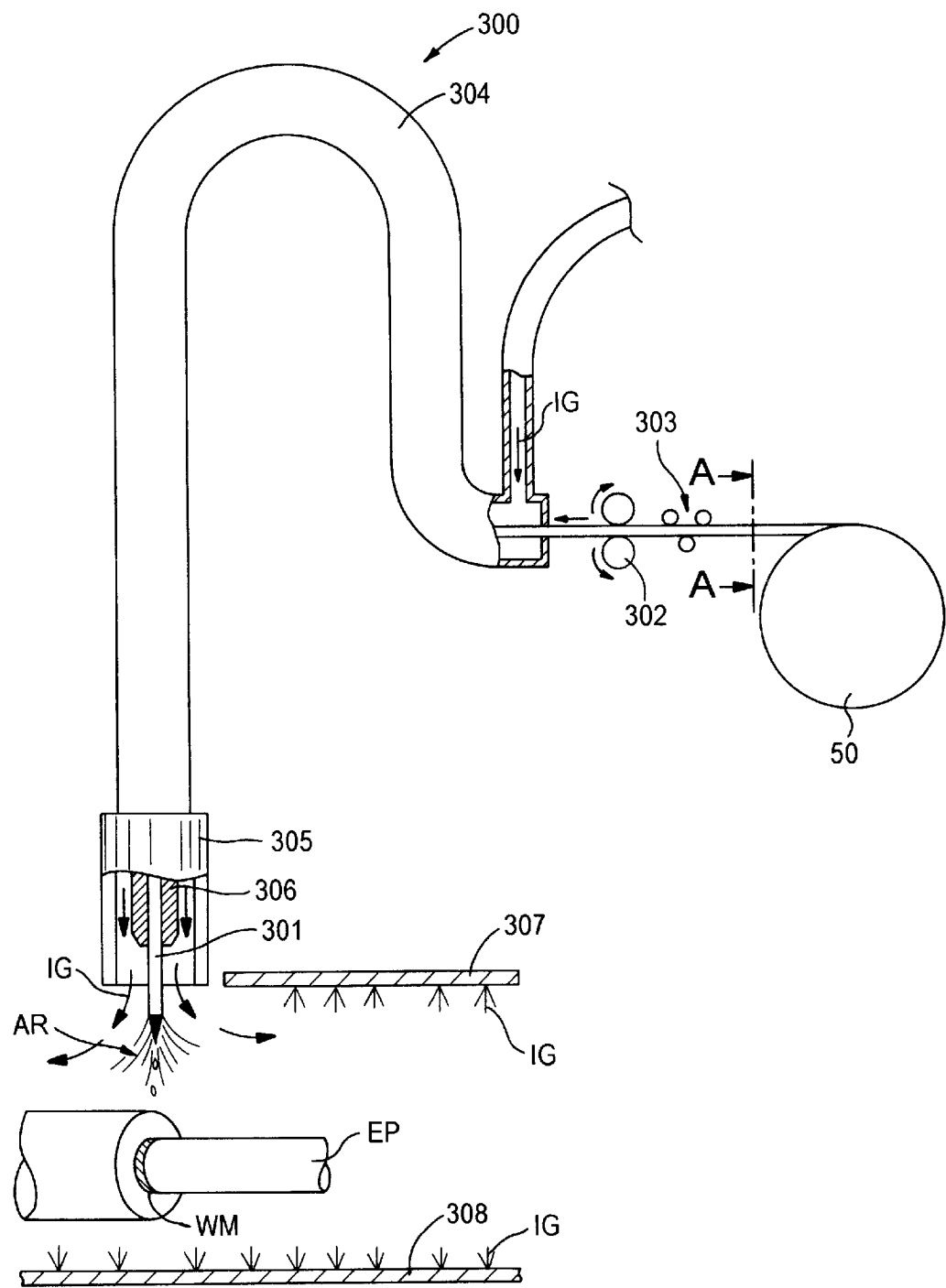
FIG. 1 is a view for schematically showing an MIG arc welding apparatus to which the present invention is applied.

FIG. 1 shows an exemplary apparatus system for MIG arc welding using the Ti-base wire rod for forming molten metal of the present invention. Although the apparatus 300 herein is illustrated as that responsible for MIG arc welding of an exhaust pipe EP for automotive engine, which is a work piece of such welding made of pure titanium or titanium alloy, the present invention is by no means limited thereto of course. The Ti-base wire rod for forming molten metal (also simply referred to as "wire rod" hereinafter) comprises Ti metal or Ti alloy (e.g., Ti-6%Al-4%V, etc.). The wire rod 301 unrolled from a reel 50 is straightened by straightening rollers 303 to remove the wire habit, and then guided with the aid of a pair of feed rollers 302 into a flexible conduit tube 304. The conduit tube 304 is provided at the end thereof with a torch 305, where an inert gas IG such as argon introduced from the rear end of such conduit tube 304 comes out from the front end of the torch 305 to be blown to a welding portion of the exhaust pipe EP, which is a work piece for the welding, to thereby form a gas shield around it.

The torch 305 has inside thereof an electrode chip 306 so as to be electrically connected therewith while allowing feeding of the wire rod 301 therethrough, which is responsible for applying high voltage to a gap between the end of the wire rod 301 and exhaust pipe EP to thereby generate arc AR. The wire rod 301 melts by heat energy of the arc, and drops onto the welding portion to form a welding bead WM. The feed rollers 302 herein continuously or intermittently feed the wire rod 301 towards the arc AR while keeping the pace with melting and consumption of the wire rod 301. The welding bead WM is hot immediately after the solidification and very likely to oxidize if the shield breaks within a short period, so that there are provided an after-shield jig 307 for covering the upper space over the welding bead WM and a back-shield jig 308 covering the back space below the welding bead WM.

Figure 2:
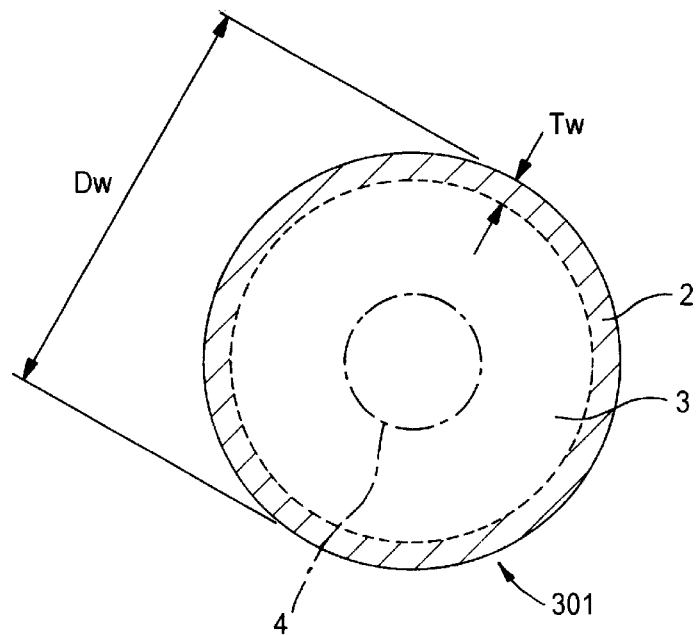
FIG. 2 is a sectional view for schematically showing a Ti-base welding wire rod of the present invention.

FIG. 2 schematically shows a section of the wire rod 301. The wire rod 301 is composed of Ti metal, and has in the surficial portion including the surface thereof an oxygen enriched layer 2 having an oxygen concentration higher than that in an inner portion 3. Ratio $T_w/D_w$ of the thickness $T_w$ of the oxygen enriched layer 2 and the rod diameter $D_w$ is adjusted within a range from $1 \times 10^{-3}$ to $50 \times 10^{-3}$, and the average oxygen concentration of the oxygen enriched layer 2 is adjusted within a range from 1 wt % to 30 wt %. A critical meaning of the numerical definition was already described above in "SUMMARY OF THE INVENTION" of this specification, and will not be repeated here, where a cause for improved arc stability can be supposed as follows. That is, the wire rod 301 is heated during the arc generation by the skin current preferentially from the surficial portion, and raises the temperature there. So that oxygen localized in the oxygen enriched layer 2 which composes such surficial portion vaporizes out into the shield gas atmosphere in the early stage of the arc melting, which creates an atmosphere equivalent to that attained when an oxygen-containing shield gas is used, and the arc is stabilized. Unlike the conventional technique by which a considerable amount of oxygen is mixed into the shield gas per se, the present invention can supply a sufficient amount of oxygen necessary for stabilizing the arc only through such vaporization from the oxygen enriched layer, which consequently reduces the amount of oxygen incorporated into the welding bead as compared with that in the conventional technique, and thus can improve the strength of the weld joint.

Ti metal composing the inner portion 3 of the wire rod 301 is preferably a pure Ti having an oxygen concentration of 0.20 wt % or less, and more preferably 0.15 wt % or less (e.g., industrial pure titanium Class 1 or 2 specified by JIS H3331 (1988)) in view of ensuring desirable characteristic of the resultant weld joint.

The surface roughness of the wire rod having formed thereon the oxygen enriched layer 2 preferably has a maximum height $R_y$ of 10 μm or less in view of improving feeding smoothness of the wire rod 301 within the conduit tube 304. Formation of the oxygen enriched layer 2 with the foregoing thickness and average oxygen concentration is of course advantageous in obtaining the wire rod whose surface roughness is properly adjusted within such numerical range. As for the surface roughness, it is also preferable that the arithmetical average roughness $R_a$ is adjusted at 0.5 μm of less. There are no special limitations on the lower limits of the maximum height $R_y$ and arithmetical average roughness $R_a$, which can properly be determined so as to be balanced with the cost (the present inventors have confirmed that $R_y$ can be reduced at least as small as 1.0 μm or around, and $R_a$ at least as small as 0.1 μm or around). It should be noted that the surface roughness described in this specification means that measured according to a method specified by JIS B0601 (1994).

While the wire rod 301 widely used is such that having a diameter $D_w$ ranging from 0.8 to 1.6 mm or around, formation of the oxygen enriched layer 2 will be advantageous in achieving an average amplitude of as small as 5 N or below in an measured profile of feeding reaction force in a rod feeding apparatus, which is a practically attainable level of feeding smoothness when such diameter $D_w$ is employed. Since the feeding reaction force can be reduced to such lower level, clogging or other troubles of the wire rod 301 within the conduit tube 304 will successfully be avoidable.

It is also preferable that the tensile strength of the wire rod 301 is adjusted within a range from 400 MPa to 1,500 MPa in view of preventing buckling of the wire rod 301 within the conduit tube 304. The tensile strength less than 400 MPa may make it difficult to fully prevent the buckling, and exceeding 1,500 MPa may result in nonconformities such as breakage or difficulty in take-up due to degraded flexibility of the wire rod 301. The tensile strength of the wire rod 301 can be controlled by adjusting the reduction of area of the cold working if the wire rod is subjected to such cold working in the final stage of the drawing, or also by adjusting annealing temperature and annealing time if the wire rod is further subjected to annealing for stress elimination. The tensile strength of the wire rod 301 more preferably resides within a range from 400 MPa to 1,200 MPa.

Figure 4A:
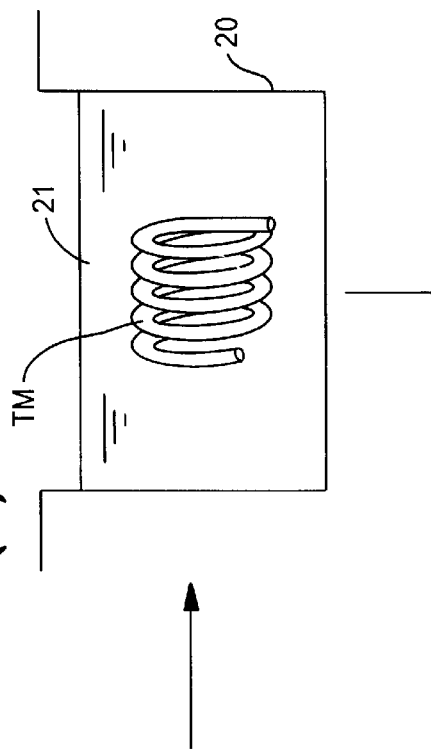
FIG. 4 is a drawing for explaining manufacturing process of the Ti-base welding wire rod of the present invention.
Figure 4B:
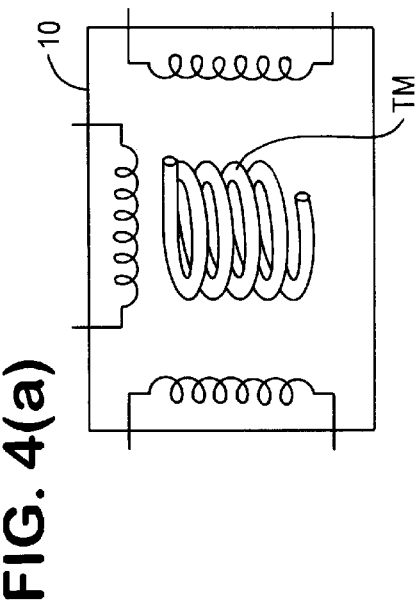
Figure 4C:
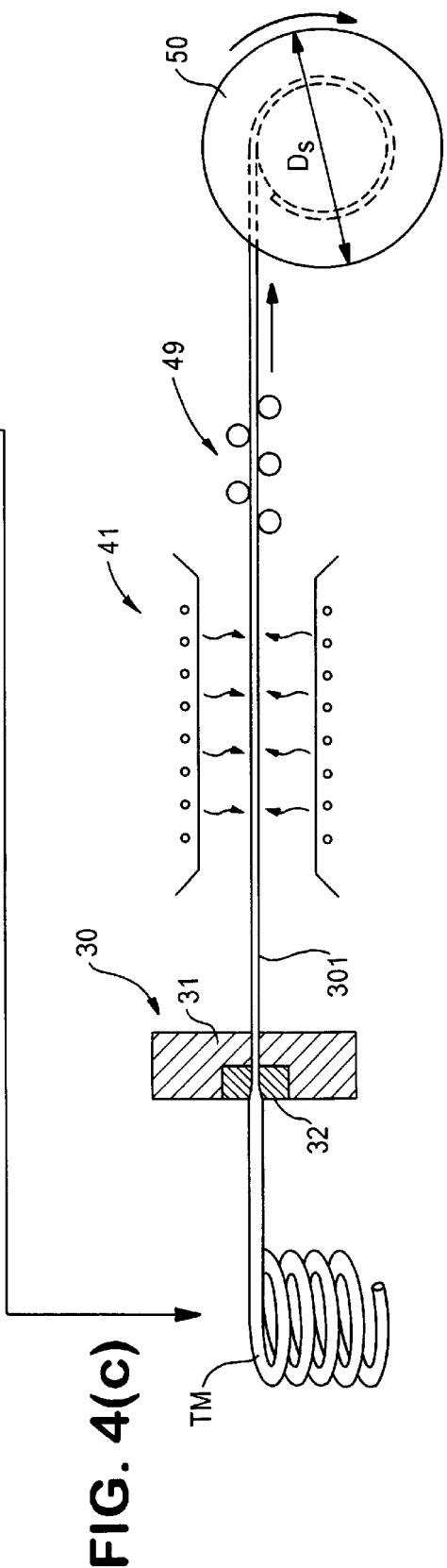
Figure 5:
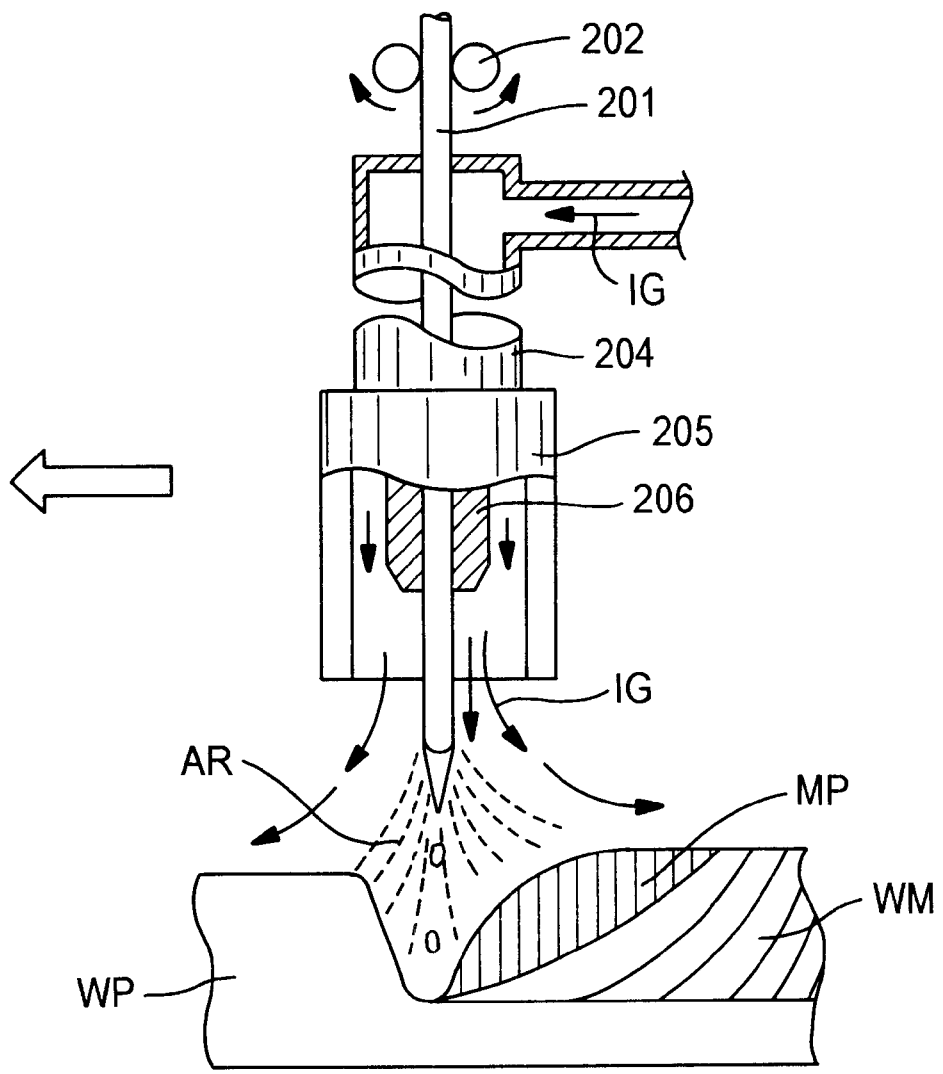
FIG. 5 is a schematic view showing a principal portion of the MIG arc welding apparatus.

The wire rod 301 can be manufactured according to a method illustrated in FIG. 4. A sponge-formed Ti or Ti ingot (typically comprising industrial pure titanium Class 1 or 2) is used as a starting material, which is then rolled into a wire material and descaled to thereby obtain a coil-formed Ti material TM. The Ti material TM is then placed in a heating furnace 10 conditioned so as to have an oxygen atmosphere with a partial pressure of oxygen of $5 \times 10^3$ to $15 \times 10^3$ Pa, or more specifically an oxygen-containing nitrogen atmosphere (including air atmosphere), and annealed at 500 to 800° C. (typically at 700° C.) for 4 to 6 hours (typically for 5 hours), as shown in (a) of FIG. 4. The annealing can improve the malleability and ductility of the Ti material through recovery and recrystallization, which finally facilitates cold drawing or so in the later stage. The annealing is also responsible for forming the oxygen enriched layer on the surficial portion of the material.

After the annealing, the Ti material TM is then dipped into a lubricant bath 20 filled with a lubricant 21 as shown in (b) of FIG. 4, to thereby form a lubricant film on the surface thereof. The lubricant film will successfully exhibit a lubricating effect between the Ti material and a drawing dice in the next drawing step, and will thus improve the drawability. The Ti material TM is then introduced into a cold drawing apparatus 30 equipped with a dice holder 31 and a drawing dice 32 fixed thereto as shown in (c) of FIG. 4. More specifically, the Ti material TM is inserted into the drawing dice 32 designed to have an approximately conical section in which the exit thereof is smaller in diameter than the entrance, and then drawn from the exit side under ordinary temperatures, which produces a wire rod 301 having a sectional shape almost similar to that of the exit of the drawing dice 32. While (c) of FIG. 4 illustrates only one drawing dice 32, it is a general practice to use a plurality of drawing dices having step-wisely reducing diameters to thereby effect step-wise degression.

Thus obtained wire rod 301 goes through a straitening portion 49 and is than taken up by a wire rod spool 50, which is subjected to the foregoing MIG arc welding.

Figure 3:
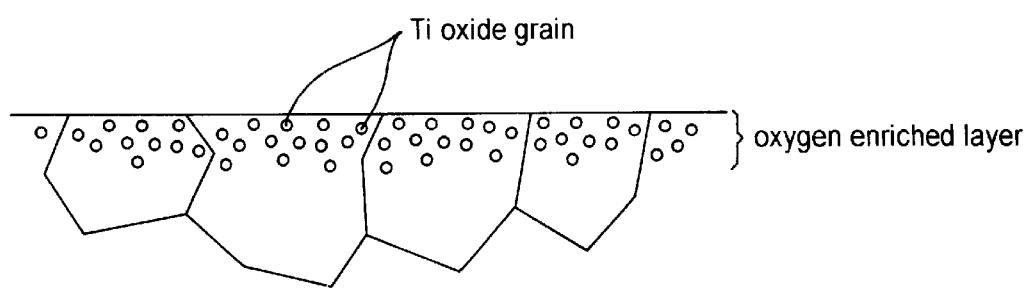
FIG. 3 is a conceptual view showing a formation status of an oxygen enriched layer.

Another possible method for diffusing oxygen from the surface of the wire rod 301 relates to use of a heating oven 41 for the drawn wire rod as shown in (c) of FIG. 4. The oxygen enriched layer can be formed not only by diffusing oxygen from the surface of the Ti material TM and/or wire rod 301 as described in the above, but also by embedding Ti oxide grains in the surficial portion of the wire rod as shown in FIG. 3. Such embedded status can typically be formed by preliminarily blending a proper amount of fine titanium oxide grains into a lubricant to be coated in the drawing process. It is to be noted that, for the case the oxygen enriched layer is excessively formed, it is also allowable to chemically or mechanically remove a part thereof so as to properly adjust the thickness of such layer.

Figure 10:
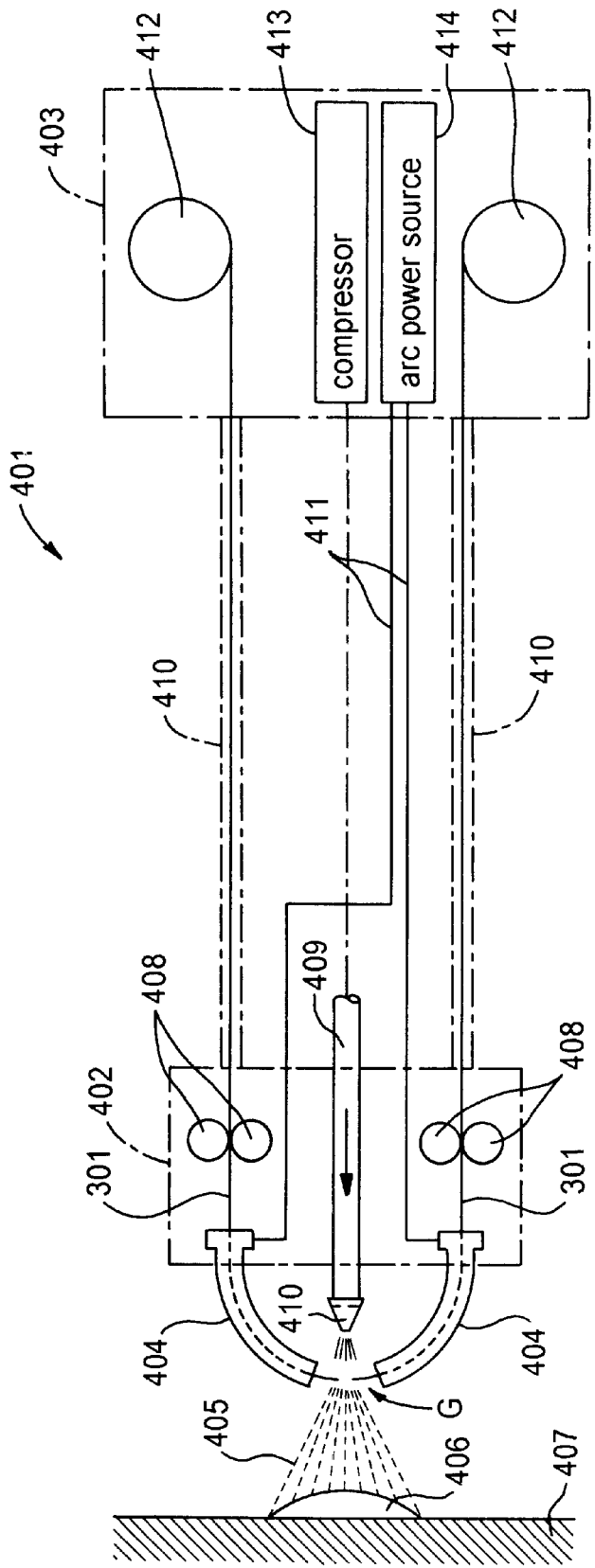
FIG. 10 is a view for schematically showing a Ti thermal spraying apparatus to which the present invention is applied.

The wire rod 301 is also available as a wire rod for thermal spraying. FIG. 10 shows an exemplary thermal spraying apparatus. The thermal spraying apparatus 401 comprises a thermal spray gun 402 and a thermal spray unit 403. Two wire rods 301, 301 respectively taken up by reels 412, 412 in the thermal spray unit 403 are respectively fed through conduit tubes 410, 410 to the thermal spray gun 402. While feeding of the wire rods 301, 301 in this embodiment is effected by pairs of feed rollers 408, 408 provided in the thermal spray gun 402 so as to withdraw the wire rods 301, 301 from the thermal spray unit 403, it is also allowable to forward the wire rods 301, 301 using feed-forward rolls provided in the thermal spray unit 403 towards the thermal spray gun 402. Combination of these arrangements is still also allowable.

In the thermal spray gun 402, the wire rods 301, 301 pass through current supply holders 404, 404, which are insulated from each other, under electrically conductive state, and are sent out so that both ends thereof are opposed in a close vicinity. When a DC arc power source 414 in the thermal spray unit 403 supplies electric current via the current supply holders 404, 404 to the wire rods 301, 301, arc discharge will be activated in a gap G formed between both ends of the wire rods 301, 301, which melts the ends of the wire rods 301, 301 to thereby form a molten metal. At a position facing to the gap G, an injection nozzle 410 is provided, to which an injection medium such as air or inert gas typified by nitrogen, argon or the like is supplied from a compressor 413 in the thermal spray unit 403 through an injection medium path 409. The molten metal formed in the gap G is then atomized together with the injection medium so as to be sprayed (405) on the surface of a work piece 407, to thereby deposit a thermal sprayed layer 406. The wire rods 301, 301 are continuously fed to the gap G while being serially melted from the ends thereof by arc discharge, so that continuing the medium supply to the injection nozzle can sustain the thermal spraying.

As has been described in the above, thermal spraying proceeds so as to feed two wire rods 301, 301 in parallel and to form arc in a gap G between both ends of such rods, so that distance of the gap G is likely to vary, which is causative of destabilized arc, if either of the feeding speed of one wire rod 301 becomes faster or slower than that of the other. In contrast, adopting the present invention can successfully keep the feeding speeds of the wire rods 301, 301 stable, which is advantageous in markedly improving the arc stability, and forming the thermal sprayed layer 406 with a higher quality.

While the above described embodiment dealt with a case in which the entire portion of the wire rod 301 was composed of Ti metal as shown in FIG. 2, it is also allowable to use a composite wire rod in which, as indicated by a dashed line in FIG. 2, only the surficial portion of the wire rod 301 is composed of a Ti metal, and the core portion is composed of another metal layer 4. For an exemplary case in which the weld portion or thermal sprayed layer is expectedly formed with a Ti alloy, it may be convenient to preliminarily form the metal layer 4 using an expected component to be alloyed with (e.g., Al, V, Al—V alloy), and to allow it to be alloyed with the Ti metal composing the outer portion when the molten metal is formed. By forming the Ti metal layer having in the surficial portion thereof an oxygen enriched layer 2, the feeding smoothness of the wire rod and arc stability will be improved to a level better than that attainable by a wire rod having the entire portion of which comprises a single alloy layer. It is also possible to spraying a metal-ceramic composite material (e.g., cermet) by using a wire rod embedded with ceramic powder in place of providing the metal layer 4. Method of thermal spraying is by no means limited to arc thermal spraying, and any of flame thermal spraying, laser thermal spraying, gas thermal spraying and plasma thermal spraying may be adoptable so far as the wire-formed spraying material is available. The effect of stabilizing rod feeding is attainable also in these thermal spraying methods, which contributes to the formation of uniform thermal sprayed layer.

The following paragraphs will describe results of our experiments carried out to confirm effects of the present invention.

EXAMPLE 1

A material used herein was titanium wire material specified by JIS H4670 (1993) (equivalent to industrial pure titanium Class 1; diameter 1.6 mm), which was heated in a heating furnace conditioned so as to keep a nitrogen atmosphere (partial pressure of oxygen of $1.2 \times 10^4$ Pa) at various temperatures ranging from 500 to 700° C. for 4 to 7 hours to thereby effect oxygen diffusion. The obtained materials were then processed by cold wire drawing to thereby produce Ti-base wire rods for forming molten metal which commonly have a diameter of 1.0 mm but differ in the oxygen concentration and thickness as listed in Tables 1 and 2. The wire rods were then subjected to measurements and assessments described below.

(1) Thickness $T_w$ of Oxygen Enriched Layer and Average Oxygen Concentration

A section of the wire rod was mirror-polished, and was then subjected to in-plane analysis of oxygen concentration by EPMA (electron probe micro-analysis), in which the peripheral portion of the wire rod having an oxygen concentration of 1.2 $C_m$ or above, where $C_m$ represents the oxygen concentration of the core portion, was defined as the oxygen enriched layer, and an integral average value of oxygen concentration of such portion was defined as the average oxygen concentration.

(2) Tensile Strength

A 100-mm-long specimen was cut out from each wire rod, to which tension was applied using an Instron-type tensile tester at a crosshead speed of 1.0 mm/min. A stress-strain curve was obtained and a maximum stress value was read as tensile strength.

(3) Surface Roughness

A roughness curve was obtained according to a method specified by JIS B0601 (1994), where the assessment length was defined along the longitudinal direction of the wire rod. A maximum height $R_y$ (μm) and arithmetical average roughness $R_a$ (μm) were individually read out from the curve.

(4) Assessment of Feeding Stability

The wire rod was set to the MIG arc welding apparatus 300, and subjected to welding at a rod feeding speed of 75 mm/sec and a current of 90 A. The conduit tube 304 employed was 3 m in length, and the stability in the feeding was judged as ○ (good feeding smoothness) if the rod was welded without causing any troubles during the rod feeding, and as X (unstable feeding smoothness) if the rod buckled at the beginning of the welding.

(5) Coefficient of Dynamic Friction

This was measured by using a Bowden-Leben-type friction tester. More specifically, a sample of the wire rod was set on the sample table, a steel member for pressing was placed thereon, and the sample table was moved at a constant velocity while being pressed under a weight of a predetermined value, where friction occurred therebetween was detected by a distortion-gauge-type load detector.

(6) Assessment of Arc Stability

Arc stability during the welding was assessed by visual observation of disturbances in the arc. The stability was judged as ○ (stable arc) if the arc was visually found to generate almost without any disturbance during the welding, and as X (unstable arc) if the arc was found to frequently fluctuate searching for a stable point.

(7) Assessment of Amount of Sputtered Material

The amount of sputtering was assessed by visually observing adhesion status of materials, sputtered from the wire rod or molten pool, on the work piece. The status was assessed as ○ (sputtering amounts zero) if no adhesion of the sputtered material was found on the work piece, and as X (sputtering amounts much) if any adhesion was found.

(8) Assessment of Bead Shape

Bead shape was assessed by visually observing appearance of the welding bead after welding. The bead shape was judged as ○ (good bead shape) if the bead was found to have a uniform width and smooth appearance, and as X (irregular bead shape) if irregular disturbance in the shape was observed.

(9) Assessment of Mechanical Characteristics (Strength/Elongation) of Weld Joint A Class 1A specimen was prepared according to JIS Z3121 (1993), and subjected to tensile test (JIS Z2241) to thereby assess elongation of the weld joint. A face-bend specimen was prepared according to JIS Z3122 (1990), and subjected to guided-bend test to thereby assess the strength. Both specimens used for these tests had a thickness t of 1.5 mm and a width W of 40 mm.

Results of the above assessments were listed in Tables 1 and 2.

TABLE 1

| Specimen No. | 1* | 2 | 3 | 4 | 5 |
|---|---|---|---|---|---|
| Diameter of wire rod $D_w$ (mm) | 1.0 | 1.0 | 1.0 | 1.0 | 1.0 |
| Thickness of oxygen enriched layer $T_w$ (μm) | 8.0 | 8.0 | 8.0 | 8.0 | 8.0 |
| $T_w/D_w$ | 8.0 × 10⁻³ | 8.0 × 10⁻³ | 8.0 × 10⁻³ | 8.0 × 10⁻³ | 8.0 × 10⁻³ |
| Oxygen concentration of oxygen enriched layer (wt %) | 0.5 | 1 | 17 | 30 | 35 |
| Tensile strength (MPa) | 800 | 800 | 800 | 800 | 800 |
| $R_y$ (μm) | 10 | 10 | 10 | 10 | 10 |
| $R_a$ (μm) | 0.2 | 0.2 | 0.2 | 0.2 | 0.2 |
| Coefficient of dynamic Friction | 0.16 | 0.15 | 0.16 | 0.14 | 0.15 |
| Feeding smoothness of wire rod | ○ | ○ | ○ | ○ | ○ |
| Arc stability | X | ○ | ○ | ○ | ○ |
| Amount of sputtered Material | ○ | ○ | ○ | ○ | ○ |
| Bead shape | X | ○ | ○ | ○ | ○ |
| Tensile strength of weld Joint | ○ | ○ | ○ | ○ | ○ |
| Elongation of weld joint | ○ | ○ | ○ | ○ | ○ |

(*indicates that the specimen is out of the Scope of the present invention)

TABLE 2

| Sample No. | 6* | 7 | 8 | 9 | 10* |
|---|---|---|---|---|---|
| Diameter of wire rod $D_w$ (mm) | 1.0 | 1.0 | 1.0 | 1.0 | 1.0 |
| Thickness of oxygen enriched layer $T_w$ (μm) | 0.8 | 8.0 | 25.0 | 50.0 | 55.0 |
| $T_w/D_w$ | 0.8 × 10⁻³ | 8.0 × 10⁻³ | 25 × 10⁻³ | 50 × 10⁻³ | 55 × 10⁻³ |
| Oxygen concentration of oxygen enriched layer (wt %) | 20 | 20 | 20 | 20 | 20 |
| Tensile strength (MPa) | 800 | 800 | 800 | 800 | 800 |
| $R_y$ (μm) | 10 | 10 | 10 | 10 | 10 |
| $R_a$ (μm) | 0.2 | 0.2 | 0.2 | 0.2 | 0.2 |
| Coefficient of dynamic friction | 0.15 | 0.14 | 0.15 | 0.16 | 0.16 |
| Feeding smoothness of wire rod | ○ | ○ | ○ | ○ | ○ |
| Arc stability | X | ○ | ○ | ○ | ○ |
| Amount of sputtered material | ○ | ○ | ○ | ○ | ○ |
| Bead shape | X | ○ | ○ | ○ | ○ |
| Tensile strength of weld joint | ○ | ○ | ○ | ○ | X |
| Elongation of weld joint | ○ | ○ | ○ | ○ | X |

(*indicates that the specimen is out of the scope of the present invention)

Table 1 shows results obtained when the average oxygen concentration of the oxygen enriched layer was varied while keeping the thickness thereof approximately constant, and Table 2 conversely shows results obtained when the thickness of the oxygen enriched layer was varied while keeping the oxygen concentration thereof approximately constant. It was found from the results that the average oxygen concentration and thickness of the oxygen enriched layer properly adjusted within the ranges specified by the present invention can successfully ensure stable generation of the arc and desirable bead shape, and that a tough weld joint excellent both in strength and ductility can thus be obtained.

FIG. 6A is a SEM (scanning electron microscope) photograph of the surface of No. 3 specimen of the wire rod listed in Table 1. It is clear that the surface of the wire rod is highly smooth. FIG. 6B is a photograph of an outer appearance of a welding bead formed by using such wire rod. The weld bead is found to have a uniform width and smooth appearance. FIG. 6C is a profile of the feeding reaction force measured at a rod feeding speed of 4.4 m/min, which revealed an average amplitude of as small as 2 N or less.

Figure 7A:
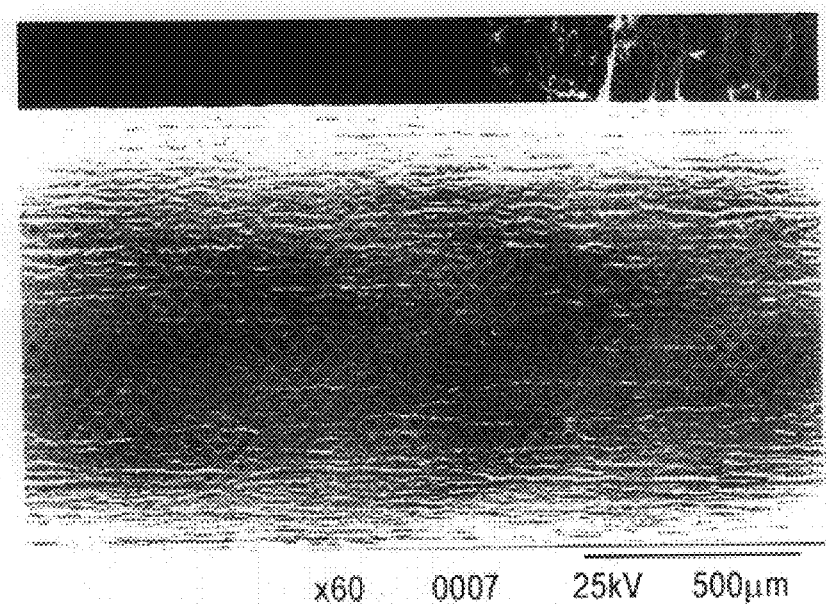
FIG. 7A is a SEM photograph of an exemplary Ti-base welding wire rod of a comparative example.
Figure 7B:
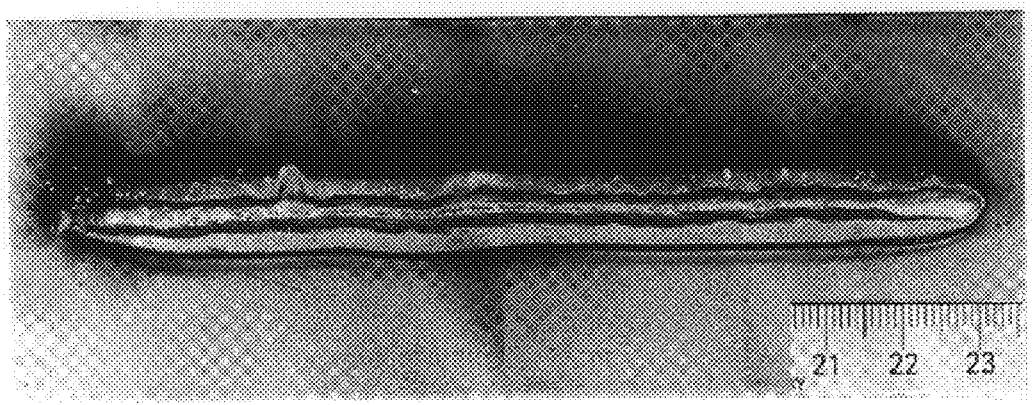
FIG. 7B is a photograph of an outer appearance of a welding bead formed by using such wire rod.
Figure 7C:
FIG. 7C is a measured profile of the feeding reaction force.

FIG. 7A is a SEM photograph of the surface of a wire rod finished using a polishing apparatus so as to have a metallic gloss. The photograph shows that the wire rod has a number of wrinkle-like irregularities running along the longitudinal direction on the surface thereof, which makes the surface coarse. FIG. 7B is a photograph of an outer appearance of a welding bead formed by using such wire rod. It is obvious that an irregular disturbance is also observed on the outer appearance of the welding bead due to arc destabilization. FIG. 7C is a profile of the feeding reaction force measured at a rod feeding speed of 4.4 m/min, which revealed an average amplitude of as large as 5 N or above with a large dispersion.

Figure 8A:
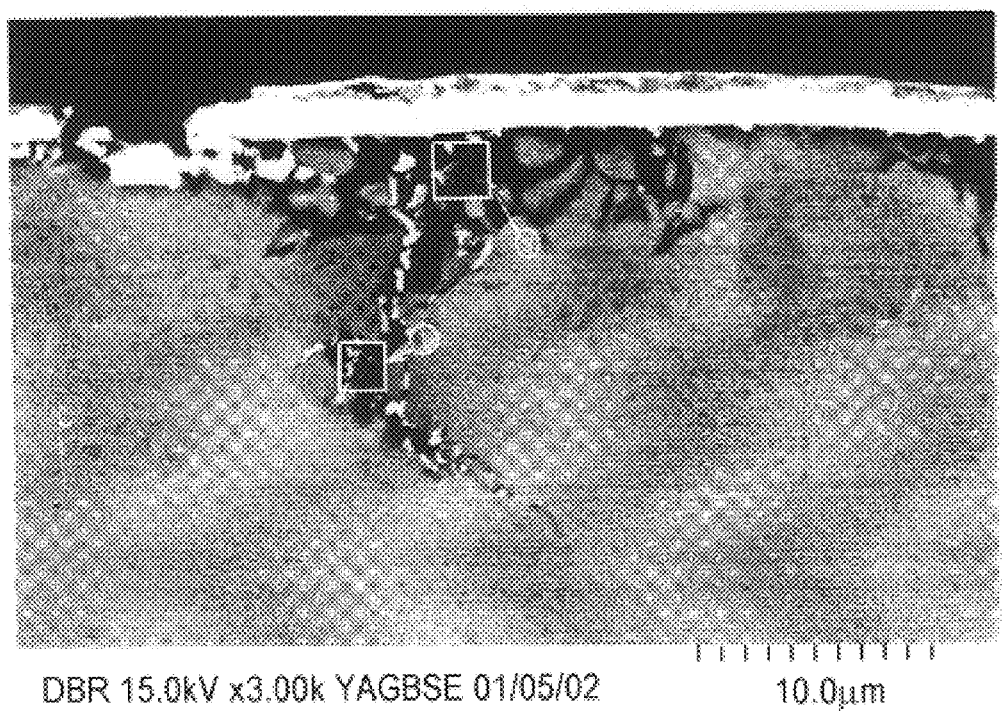
FIGS. 8A and 8B are enlarged sectional SEM photographs of the surficial portion of the wire rod shown in FIG. 6A.
Figure 8B:
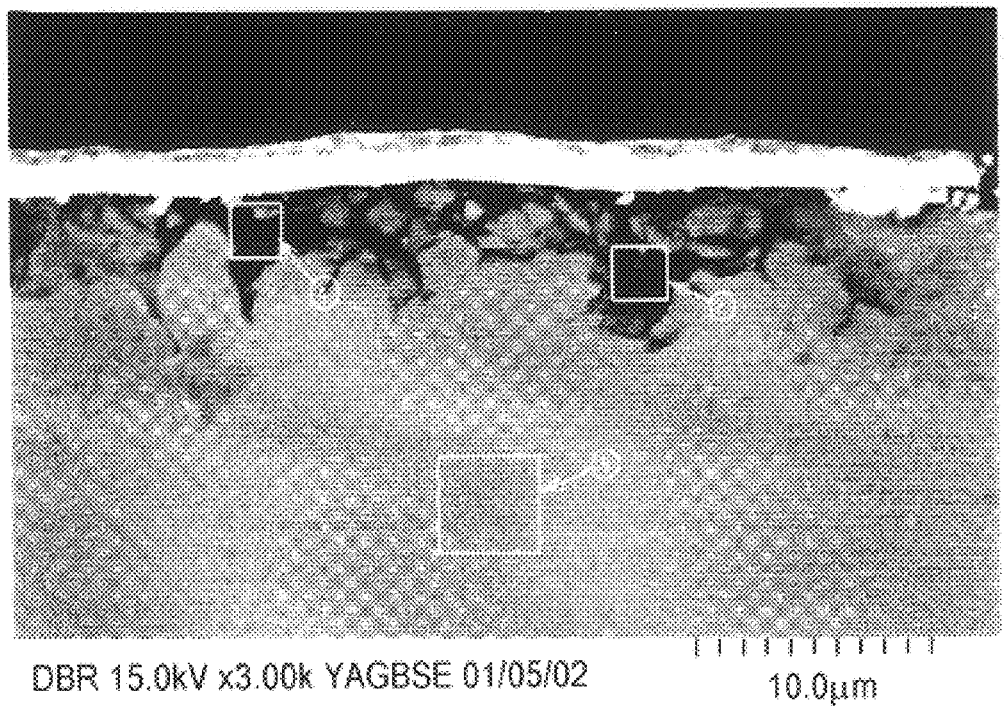
Figure 9A:
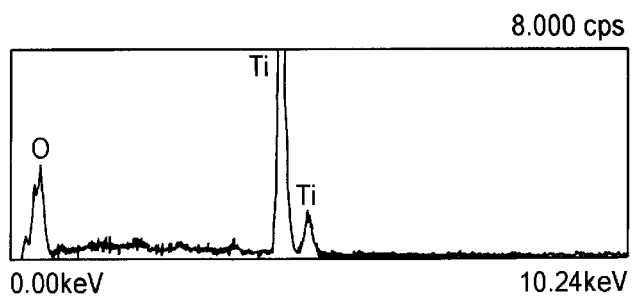
FIGS. 9A to 9E are EDX compositional analytical profile measured at the individual numbered sites shown in FIGS. 8A and 8B.
Figure 9B:
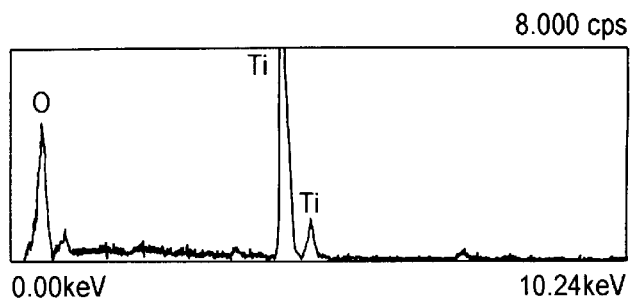
Figure 9C:
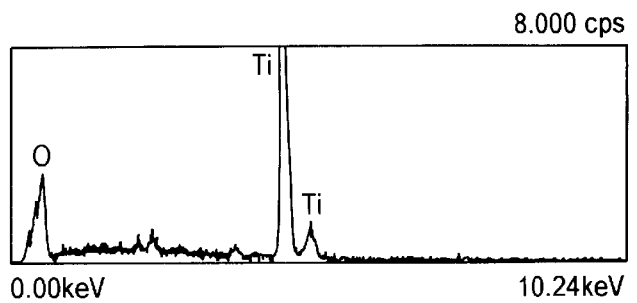
Figure 9D:
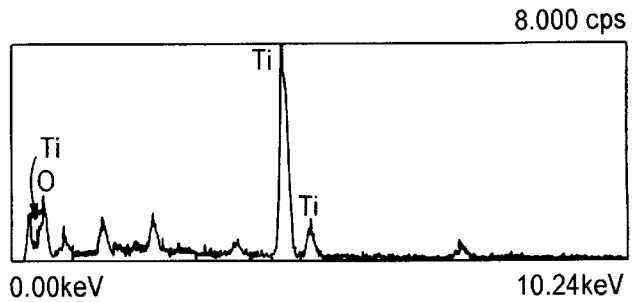
Figure 9E:
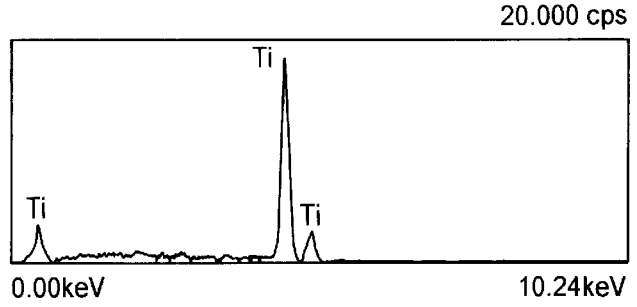

FIGS. 8A and 8B are enlarged sectional SEM photographs of the surficial portion of the wire rod shown in FIG. 6A (bright portions seen in the photographs are ascribable to an Ni plated layer provided on the outer periphery of the wire rod in order to prevent face chamfering which may otherwise be caused by polishing a section). An area having a contrast slightly differs from that of the core portion of Ti crystal grain, and a void probably generated by elimination of part of such area are observed along the crystal boundary. Compositions of the individual sites given with reference numerals ① to ⑤ in the photographs shown in FIG. 8A and FIG. 8B were then analyzed using an EDX (energy-dispersive X-ray) analyzer incorporated into the SEM. Results were shown in FIGS. 9A to 9E, which correspond to the sites ① to ⑤ in FIGS. 8A and 8B, respectively. The sites ① to ④ which locate in the vicinity of the crystal boundary in the surficial portion of the wire rod were found to have peaks of oxygen (O) apparently higher than that of the site ⑤ which locates in the inner portion, which proved formation of the oxygen enriched layer. The surficial portion of the wire rod was also subjected to compositional analysis by EDX. Peaks ascribable to titanium and oxygen were observed over the entire surface of the wire rod, which indicates that the surface is uniformly covered with a titanium oxide layer.

EXAMPLE 2

A material used herein was titanium wire material specified by JIS H4670 (1993) (equivalent to industrial pure titanium Class 1; diameter 2.5 mm), which was heated in a heating furnace conditioned so as to keep a nitrogen atmosphere (partial pressure of oxygen of $1.2 \times 10^4$ Pa) at various temperatures ranging from 500 to 700° C. for 4 to 7 hours to thereby effect oxygen diffusion. The obtained materials were then processed by cold wire drawing to thereby produce Ti-base wire rods for forming molten metal which commonly have a diameter of 1.6 mm but differ in the oxygen concentration and thickness as listed in Tables 3 and 4. The wire rods were then subjected to measurements and assessments described below.

(1) Thickness of $T_w$ of Oxygen Enriched Layer and Average Oxygen Concentration A section of the wire rod was mirror-polished, and was then subjected to in-plane analysis of oxygen concentration by EPMA (electron probe micro analysis), in which the peripheral portion of the wire rod having an oxygen concentration of 1.2 $C_m$ or above, where $C_m$ represents the oxygen concentration of the core portion, was defined as the oxygen enriched layer, and an integral average value of oxygen concentration of such portion was defined as the average oxygen concentration.

(2) Tensile Strength

A 100-mm-long specimen was cut out from each wire rod, to which tension was applied using an Instron-type tensile tester at a crosshead speed of 1.0 mm/min. A stress-strain curve was obtained and a maximum stress value was read as tensile strength.

(3) Surface Roughness

A roughness curve was obtained according to a method specified by JIS B0601 (1994), where the assessment length was defined along the longitudinal direction of the wire rod. A maximum height $R_y$ (μm) and arithmetical average roughness $R_a$ (μm) were individually read out from the curve.

(4) Assessment of Feeding Stability

The wire rod was set to the commercial arc thermal spraying apparatus shown in FIG. 10, and subjected to thermal spraying at a rod feeding speed of 40 mm/sec and a current of 200 A for 5 successive minutes. The conduit tube 410 employed was 3 m in length, and the stability in the feeding was judged as ○ (good feeding smoothness) if the rod was subjected to thermal spraying without causing any troubles during the rod feeding, and as X (unstable feeding smoothness) if the rod buckled at the beginning of the thermal spraying.

(5) Assessment of Arc Stability

The number of interruption of the arc during the thermal spraying was counted, and the arc stability was judged as ○ if the arc was not interrupted during the thermal spraying, as Δ if the arc was temporality disturbed, and as X if the arc was interrupted.

Results of the above assessments were listed in Tables 3 and 4.

TABLE 3

| Specimen No. | 11* | 12 | 13 | 14 |
|---|---|---|---|---|
| Diameter of wire rod $D_w$ (mm) | 1.6 | 1.6 | 1.6 | 1.6 |
| Thickness of oxygen enriched layer $T_w$ (μm) | 10 | 10 | 10 | 10 |
| $T_w/D_w$ | $6.3 \times 10^{-3}$ | $6.3 \times 10^{-3}$ | $6.3 \times 10^{-3}$ | $6.3 \times 10^{-3}$ |
| Oxygen concentration of oxygen enriched layer (wt %) | 0.5 | 1 | 20 | 35 |
| Tensile strength (MPa) | 750 | 750 | 750 | 750 |
| $R_y$ (μm) | 10 | 10 | 10 | 10 |
| $R_a$ (μm) | 0.2 | 0.2 | 0.2 | 0.2 |
| Coefficient of dynamic friction | 0.15 | 0.15 | 0.16 | 0.15 |
| Feeding smoothness of wire rod | ○ | ○ | ○ | ○ |
| Arc stability | Δ | ○ | ○ | ○ |

(*indicates that the specimen is out of the scope of the present invention)

TABLE 4

| Specimen No. | 15* | 16 | 17 | 18 |
|---|---|---|---|---|
| Diameter of wire rod $D_w$ (mm) | 1.6 | 1.6 | 1.6 | 1.6 |
| Thickness of oxygen enriched layer $T_w$ (μm) | 1.1 | 10 | 30 | 60 |
| $T_w/D_w$ | $0.7 \times 10^{-3}$ | $6.3 \times 10^{-3}$ | $19 \times 10^{-3}$ | $38 \times 10^{-3}$ |
| Oxygen concentration of oxygen enriched layer (wt %) | 20 | 20 | 20 | 20 |
| Tensile strength (MPa) | 750 | 750 | 750 | 750 |
| $R_y$ (μm) | 10 | 10 | 10 | 10 |
| $R_a$ (μm) | 0.2 | 0.2 | 0.2 | 0.2 |

TABLE 4-continued

| Specimen No. | 15* | 16 | 17 | 18 |
|---|---|---|---|---|
| Coefficient of dynamic friction | 0.16 | 0.14 | 0.15 | 0.16 |
| Feeding smoothness of wire rod | ○ | ○ | ○ | ○ |
| Arc stability | X | ○ | ○ | ○ |

(*indicates that the specimen is out of the scope of the present invention)

Table 3 shows results obtained when the average oxygen concentration of the oxygen enriched layer was varied while keeping the thickness thereof approximately constant, and Table 4 conversely shows results obtained when the thickness of the oxygen enriched layer was varied while keeping the oxygen concentration thereof approximately constant. It was found from the results that the average oxygen concentration and thickness of the oxygen enriched layer properly adjusted within the ranges specified by the present invention can successfully ensure stable generation of the arc and desirable feeding smoothness of the wire rod.

EXAMPLE 3

The wire rods (diameter 1.6 mm) individually made of Ti-6Al-4V alloy (α+β type), Ti-6Al-2Sn-4Zr-2Mo-0.1Si alloy (near-α type), and Ti-22V-4Al alloy (β type) were heated in a heating furnace conditioned so as to keep a nitrogen atmosphere (partial pressure of oxygen of $1.2 \times 10^4$ Pa) at various temperatures ranging from 500 to 700° C. for 4 to 7 hours to thereby effect oxygen diffusion. The obtained materials were then processed by cold wire drawing to thereby produce Ti-base wire rods for forming molten metal which commonly have a diameter of 1.0 mm but differ in the oxygen concentration and thickness as listed in Table 5. The wire rods were then subjected to measurements and assessments similarly to Example 1. Results were shown in Table 5.

TABLE 5

| | α + β-type alloy Ti-6 Al-4 V | | Near α-type alloy Ti-6 Al-2 Sn-4 Zr-2 Mo-0.1 Si | | β-type alloy T-22 V-4 Al | | Palladium-added alloy Ti-0.15 Pd | |
|---|---|---|---|---|---|---|---|---|
| Sample No. | 1 | 2* | 3 | 4* | 5 | 6* | 7 | 8* |
| Diameter of wire rod Dw (m/m) | 1.0 | 1.0 | 1.0 | 1.0 | 1.0 | 1.0 | 1.0 | 1.0 |
| Thickness of oxygen enriched layer Tw (μm) | 7.0 | 150 | 10.0 | 0.5 | 6.0 | 200 | 7.6 | 0.6 |
| Tw/Dw | $7.0 \times 10^{-3}$ | $1.5 \times 10^{-1}$ | $1.0 \times 10^{-2}$ | $0.5 \times 10^{-3}$ | $6.0 \times 10^{-3}$ | $2.0 \times 10^{-1}$ | $7.6 \times 10^{-3}$ | $0.6 \times 10^3$ |
| Oxygen concentration of oxygen enriched layer (wt %) | 16 | 31 | 21 | 18 | 18 | 31 | 19 | 23 |
| Tensile strength (MPa) | 1100 | 1150 | 1150 | 1150 | 1000 | 980 | 730 | 750 |
| Ry(μm) | 7 | 9 | 9 | 8 | 6 | 7 | 7 | 6 |
| Ra(μm) | 0.2 | 0.7 | 0.3 | 0.2 | 0.1 | 0.3 | 0.3 | 0.3 |
| Coefficient of dynamic friction | 0.15 | 0.14 | 0.14 | 0.16 | 0.15 | 0.15 | 0.16 | 0.15 |
| Feeding smoothness of wire rod | ○ | ○ | ○ | ○ | ○ | ○ | ○ | ○ |
| Arc stability | ○ | ○ | ○ | X | ○ | ○ | ○ | X |
| Sputtering generation property | ○ | ○ | ○ | ○ | ○ | ○ | ○ | ○ |
| Bead shape | ○ | ○ | ○ | X | ○ | ○ | ○ | X |
| Tensile strength of weld joint | ○ | X | ○ | ○ | ○ | X | ○ | ○ |
| Elongation of weld joint | ○ | X | ○ | ○ | ○ | X | ○ | ○ |

(* indicates that the specimen is out of the scope of the present)

Also for these alloy wire rods, it was found from the results that the average oxygen concentration and thickness of the oxygen enriched layer properly adjusted within the ranges specified by the present invention can successfully ensure stable generation of the arc and desirable feeding smoothness of the wire rod.

What is claimed is:

1. A Ti-base wire rod for forming molten metal which is serially melted from an end under heating to thereby produce molten metal comprising Ti or Ti alloy, wherein at least a portion including the surface of the wire rod comprises Ti metal or Ti alloy mainly composed of Ti, and the surficial portion of the wire rod including the surface thereof has formed therein an oxygen enriched layer having an oxygen concentration higher than that of the inner portion and having a thickness larger than that of native oxide film possibly formed on the Ti metal in the air under ordinary temperature.

2. The Ti-base wire rod for forming molten metal according to claim 1, wherein said rod is used as a Ti-base welding wire rod for forming weld metal as the molten metal.

3. The Ti-base wire rod for forming molten metal according to claim 1, wherein said rod is used as a Ti thermal spraying wire rod for forming thermal sprayed metal layer as the molten metal.

4. The Ti-base wire rod for forming molten metal according to claim 1, wherein surface roughness of said rod is expressed by a maximum height $R_y$ of 10 μm or below.

5. The Ti-base wire rod for forming molten metal according to claim 1, wherein said rod has a diameter $D_w$ of 0.6 to 2.0 mm, and an average amplitude of feeding reaction force of 15 N or below.

6. The Ti-base wire rod for forming molten metal which is serially melted from an end under heating to thereby produce molten metal comprising Ti or Ti alloy, wherein at least a portion including the surface of the wire rod comprises Ti metal or Ti alloy mainly composed of Ti, and the surficial portion of the wire rod including the surface thereof has formed therein an oxygen enriched layer having an oxygen concentration higher than that of the inner portion, said oxygen enriched layer being adjusted so that ratio $T_w/D_w$ falls within a range from $0.3 \times 10^{-3}$ to $1 \times 10^{-1}$, where $T_w$ represents the thickness of the oxygen enriched layer and $D_w$ represents the diameter of the wire rod; and said oxygen enriched layer having an average oxygen concentration of 1 wt % or above.

7. The Ti-base wire rod for forming molten metal according to claim 6, wherein said rod is used as a Ti-base welding wire rod for forming weld metal as the molten metal.

8. The Ti-base wire rod for forming molten metal according to claim 7, wherein said oxygen enriched layer is adjusted so that ratio $T_w/D_w$ resides within a range from $1\times10^{-3}$ to $50\times10^{-3}$, where $T_w$ represents the thickness of the oxygen enriched layer and $D_w$ represents the diameter of the wire rod; and said oxygen enriched layer has an average oxygen concentration of 1 wt % to 30 wt %.

9. The Ti-base wire rod for forming molten metal according to claim 6, wherein said rod is used as a Ti thermal spraying wire rod for forming thermal sprayed metal layer as the molten metal.

10. The Ti-base wire rod for forming molten metal according to claim 9, wherein said ratio $T_w/D_w$ falls within a range from $1\times10^{-3}$ to $1\times10^{-1}$, where $T_w$ represents the thickness of the oxygen enriched layer and $D_w$ represents the diameter of the wire rod; and said oxygen enriched layer has an average oxygen concentration of 1 wt % to 40 wt %.

11. The Ti-base wire rod for forming molten metal according to claim 6, wherein surface roughness of said rod is expressed by a maximum height $R_y$ of 10 μm or below.

12. The Ti-base wire rod for forming molten metal according to claim 6, wherein said rod has a diameter $D_w$ of 0.6 to 2.0 mm, and an average amplitude of feeding reaction force of 15 N or below.

* * * * *